July 12, 1960

R. L. JAESCHKE 2,945,104

ELECTRICALLY CONTROLLED CLUTCHES

Filed Aug. 26, 1957

INVENTOR.
RALPH L. JAESCHKE
BY Hudson, Boughton,
Williams, David & Hoffmann
ATTORNEYS

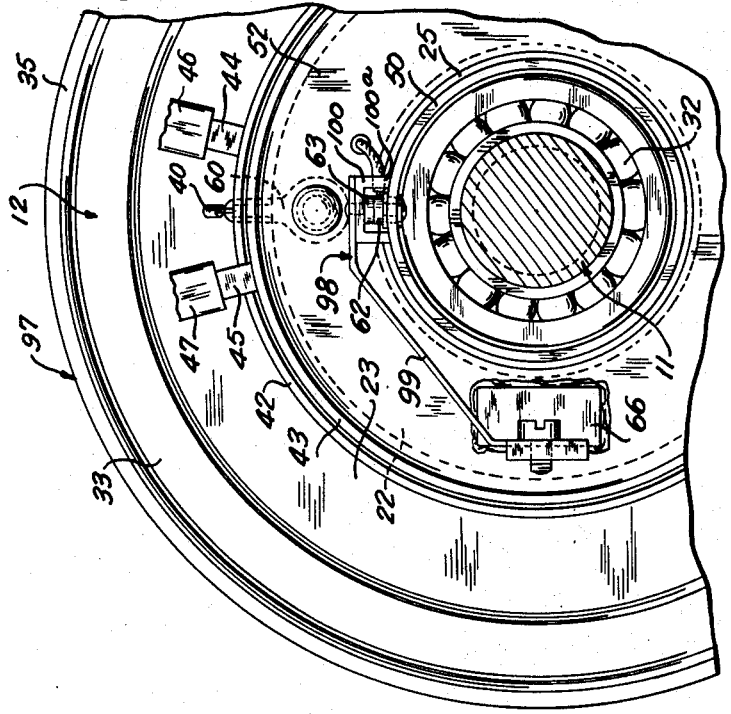
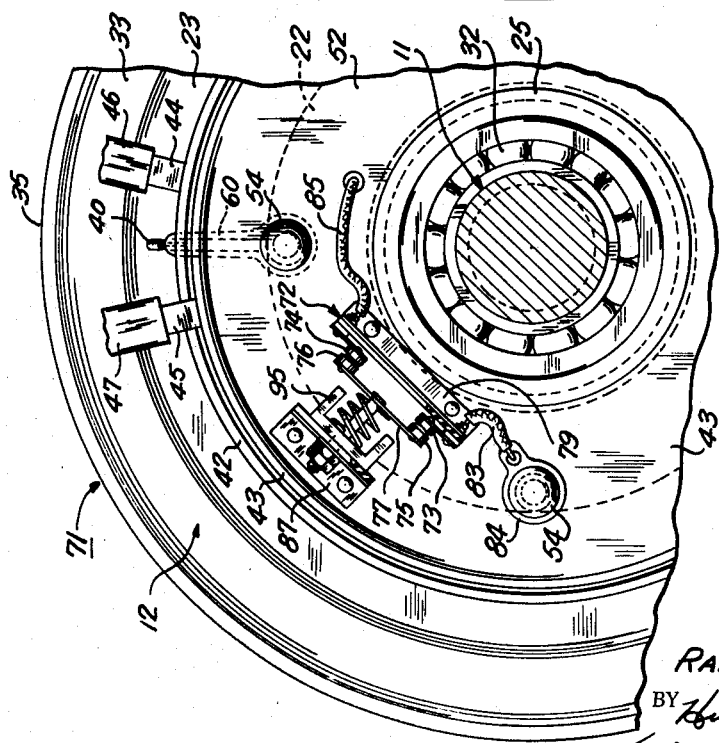
INVENTOR.
RALPH L. JAESCHKE
BY Hudson, Boughton,
Williams, David & Hoffmann
ATTORNEYS

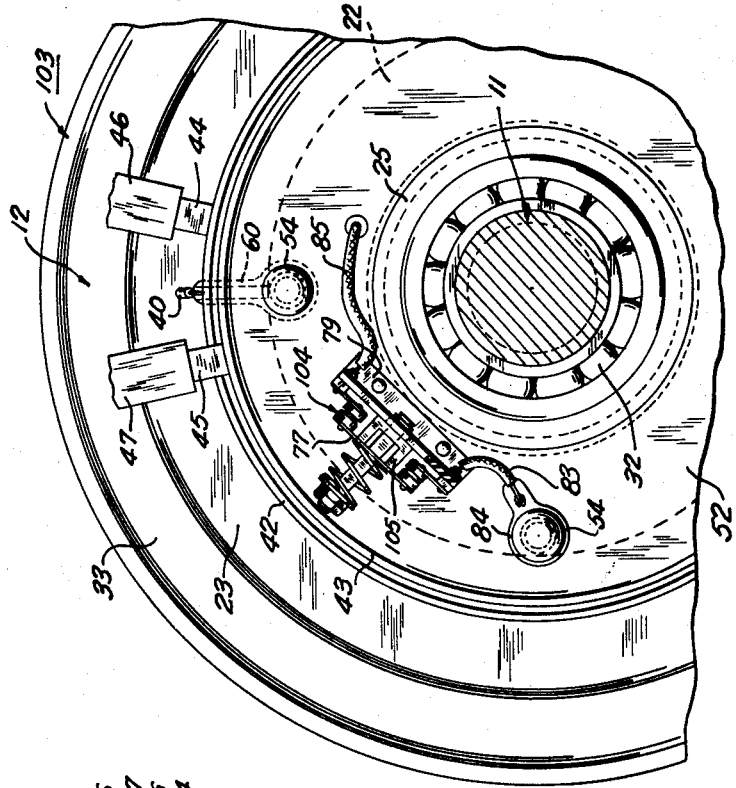
July 12, 1960   R. L. JAESCHKE   2,945,104
ELECTRICALLY CONTROLLED CLUTCHES
Filed Aug. 26, 1957   3 Sheets-Sheet 3
INVENTOR.
RALPH L. JAESCHKE
BY
ATTORNEYS

United States Patent Office 2,945,104
Patented July 12, 1960

2,945,104

ELECTRICALLY CONTROLLED CLUTCHES

Ralph L. Jaeschke, Kenosha, Wis., assignor to Eaton Manufacturing Company, Cleveland, Ohio, a corporation of Ohio Filed Aug. 26, 1957, Ser. No. 680,242

15 Claims. (Cl. 200—87)

This invention relates to electrically controlled clutches for the transmission of driving torque at a regulated speed of rotation and provides a novel clutch mechanism by which an input member, rotatable at widely varying operating speeds, will drive an output member at a desired regulated rate of speed suitable for the safe and efficient operation of a mechanism to be driven, such as a compressor of a refrigerating or air conditioning unit.

In driving auxiliary equipment from a variable speed vehicle engine, situations arise where the use of a single speed ratio transmission means between the engine and auxiliary device may be suitable for the idling or low speed operation of the engine, but would be unsuitable for high engine speeds because it would result in the auxiliary device being driven at an excessive or unsafe rate of speed. The present invention proposes to meet this problem by providing a novel speed responsive power transmission clutch which will transmit torque to the driven device, either continuously or intermittently in accordance with existing operating conditions, such that the device will be driven at a desired substantially uniform rate of speed regardless of wide variations in the operating speed of the vehicle engine.

The present invention also solves a troublesome problem heretofore encountered in the operation of friction clutches where attempts to have a friction clutch transmit a substantially uniform torque by a partial engagement of the clutch (slipping), have resulted in overheating and consequent shortening of the clutch life.

In the solution of the above problems, the present invention utilizes a "pulsing principle" of clutch construction and operation by which alternate engagement and disengagement of the clutch at a relatively rapid rate causes the occurrence of "torque pulses" of a frequency and duration dependent upon the characteristics of the load and the characteristic of the clutch itself, such that the load will be driven at the desired substantially uniform speed and overheating of the clutch will be prevented because of the intervening idle or disengagement periods between successive torque pulses during which cooling of the clutch can take place.

As an object of broad aspect, this invention aims to provide a novel electrically controlled clutch having delayed-action centrifugal switch means operable in response to a given speed differential for causing intermittent engagement and disengagement of the clutch, such that the transmission of power at a substantially uniform rate of speed will be produced by successive torque pulses or impulses, with cooling of the clutch members taking place between the successive pulses.

The above reference to a compressor as the load to be driven is by way of example and is not intended to be limiting on the utility of the clutches of this invention. When the load to be driven is one having a relatively high inertia the torque pulses can be relatively less frequent, that is, at a higher speed differential for the operation of the control switch because a load of this character will not require a continuous torque imput. On the other hand, when the load is one having a relatively low inertia, such as a fan, the torque pulses can be more frequent or, in other words, at a lower speed differential for the operation of the control switch.

Another object of this invention is to provide an electrically energizable clutch having a centrifugally responsive control switch, and in which a holding means effective on the switch retards or delays the actuation thereof for automatically determining the speed range or speed differential within which the auxiliary device will be driven.

Still another object is to provide such an electrically energizable clutch in which the holding means for delaying the actuation of the control switch is a magnet, preferably a permanent magnet.

Yet another object is to provide such an electrically energizable clutch in which the control switch and the holding means effective thereon are connected for rotation with the power output member of the clutch.

This invention also provides an electrically energizable clutch of the kind above referred to in which one of the cooperating contact members of the control switch is resiliently biased toward a normally-closed position and in which the centrifugal actuation of the movable contact member is in opposition to such bias and wherein the holding action of the permanent magnet delays the reclosing of the contact members, although the invention also contemplates having the permanent magnet disposed so as to delay the centrifugal opening of the contact members.

A further object is to provide an electrically controlled friction clutch having some or all of the structural and operating characteristics of the foregoing objects.

Additionally, this invention provides novel electrically controlled clutch means in which a yieldable and tiltable support means for one or more of the cooperating contact members of the control switch produces a wiping engagement between the contact members during the closing actuation thereof.

Other objects and advantages of this invention will be apparent in the following detailed description, and in the accompanying drawings forming a part of this specification and in which:

Fig. 3 is a wiring diagram of the energizing and control circuit for the clutch of Figs. 1 and 2.

Fig. 4 is a partial end elevation similar to that of Fig. 1, but showing such a clutch provided with a different form of control switch.

Fig. 5 is a fragmentary sectional view taken through the control switch of Fig. 4 and showing the same on a larger scale.

Fig. 6 is another fragmentary sectional view taken on section line 6—6 of Fig. 5 and showing the wiping engagement of the cooperating contact members.

Fig. 7 is another partial end elevation similar to that of Fig. 1 but showing such a clutch provided with still another form of control switch.

Fig. 8 is another such partial end elevation showing a clutch with yet another form of control switch, and Fig. 9 is a sectional view taken through the control switch of Fig. 8 and showing the same on a larger scale.

Figure 2:
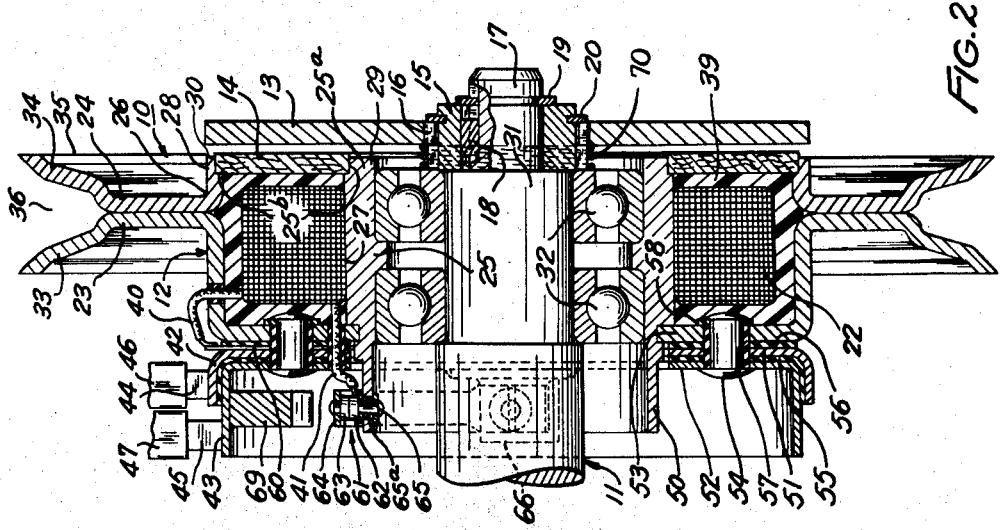
Fig. 2 is an axial section taken through the clutch as indicated by section line 2—2 of Fig. 1.
Figure 1:
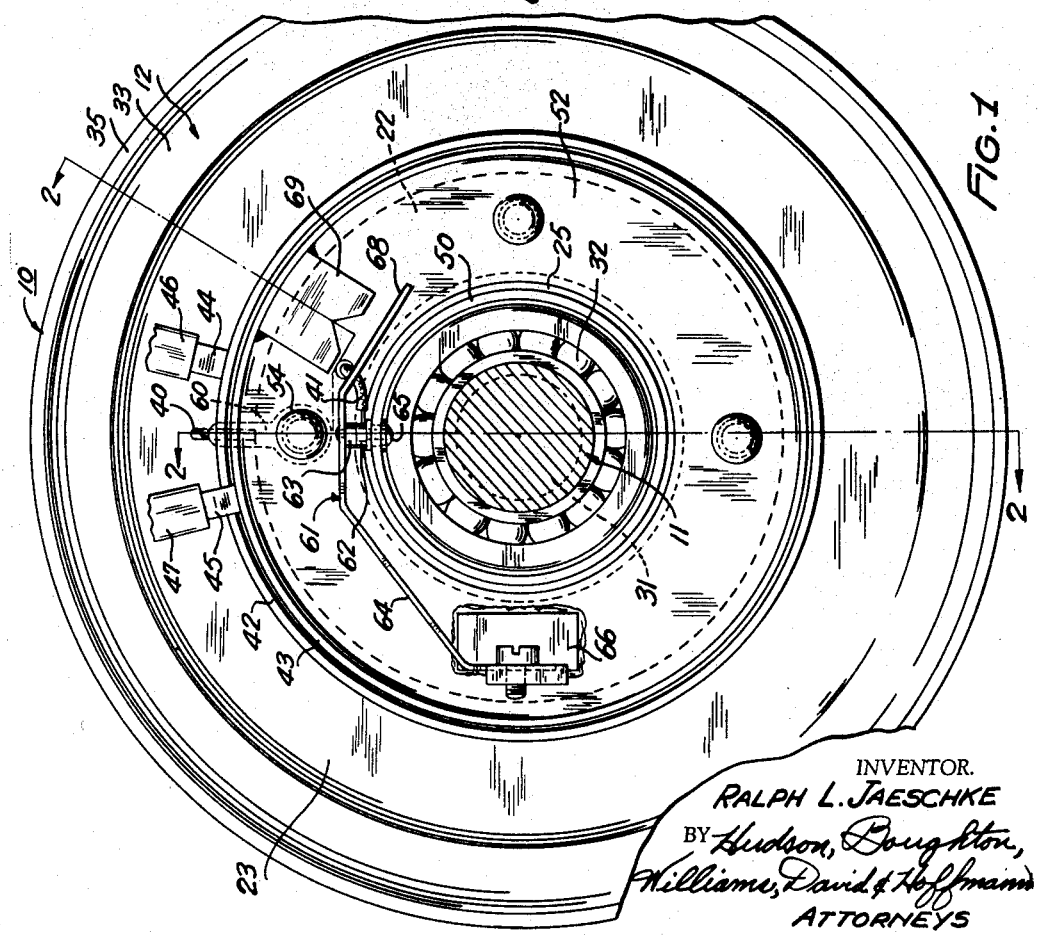
Fig. 1 is an end elevation with portions in cross-section, showing a power transmission clutch embodying the present invention.

As one practical embodiment of the present invention, Figs. 1 and 2 show a power transmission device in the form of a clutch 10 comprising a pair of relatively rotatable power transmitting members 11 and 12, and a pair of cooperating clutch members 13 and 14 connected with the respective power transmitting members. In the clutch 10 here shown, the member 11 is the driving or power input member and can be any rotatable shaft or part, such as a projection of a crankshaft or of a driven auxiliary shaft of a variable speed vehicle engine. The member 12 is the driven or power output member of the clutch 10, and is here shown as being coaxially disposed around the shaft 11.

The clutch member 13 is here shown as being a clutch disk of magnetic material which is axially slidable on a support sleeve 15 by means of a spline connection 16 therebetween. The sleeve 15 provides a driving connection between the clutch member 13 and the reduced shaft extension 17 of the input shaft 11 and, for this purpose, is fixed on such shaft extension as by means of the key 18 and the snap ring 19. Disengagement of the clutch plate 13 from the sleeve 15 is prevented by a second snap ring 20.

The clutch member 14 comprises a flat ring mounted on the driven member 12 and engageable by the clutch member 13 in response to axial movement of the latter to a clutch-engaged position. The clutch member 14 is made of a material suitable for clutch linings and which will have a relatively long life.

The driven member 12 comprises an electromagnet which is energizable for moving the clutch member 13 to its clutch-engaged position against the clutch member 14 and includes a field coil 22 of a toroidal shape. The driven member 12 is here shown as comprising a pair of formed annular members 23 and 24 which are connected with each other and with a support hub or barrel 25 so as to constitute an annular magnet frame 26 containing an annular recess or chamber 27 in which the toroidal field coil 22 is located. The annular members 23 and 24 are disposed in surrounding relation to the hub 25, such that the axially extending portion 28 of the member 24 and the outer end portion 25a of the hub 25 form a pair of recessed annular support shoulders 25b for the clutch member 14 and also form a pair of annular magnet poles 29 and 30 which are spanned by the outer annular portion of the clutch member 13 and are magnetically effective on the latter when the field coil 22 is energized.

As shown in Fig. 2, the driven member 12 is rotatably mounted on a reduced portion 31 of the input shaft 11 as by means of a pair of antifriction bearings 32 located between this shaft portion and the hub 25. The outer peripheral portions 33 and 34 of the annular members 23 and 24 are oppositely inclined and form the rim of a pulley 35 having a V-groove 36 therein. The pulley 35 is adapted to be connected by a means suitable belt (not shown) with the device or mechanism to be driven and which, as indicated above, may be the compressor of a refrigerating or air conditioning unit, or may be any other apparatus desired to be driven.

A suitable energizing circuit is provided for the field coil 22, such as the circuit shown in Fig. 3, by which the field coil is adapted to be connected with a source of energizing current such as a storage battery 38. The energizing circuit preferably includes a manually operable switch means which is here shown embodied in an ignition switch 37.

The field coil 32 is suitably insulated from the metallic portion of the driven member 12 as by means of a suitable insulating cover 39, and has lead wires 40 and 41 extending from the ends thereof. A pair of slip rings 42 and 43 are provided on the driven member 12 and are slidably engaged by a pair of brushes 44 and 45 projecting from suitable brush holders 46 and 47.

The support hub 25 of the driven member 12 includes a drum-shaped extension portion or sleeve 50 extending around the shaft 11 in coaxial relation thereto. The slip rings 42 and 43 are here shown as being cup-shaped annular members having web or disk portions 51 and 52 lying adjacent the radial wall 53 of the driven member 12 and secured against the latter by suitable rivets 54. The slip rings 42 and 43 are electrically insulated from each other by an intervening insulating layer 55 and from the radial wall 53 by another such insulating layer 56. The rivets 54 are electrically insulated from the parts through which they extend except the web 52 of the slip ring 43, as by suitable insulating sleeves and washers 57 and 58.

One end of the field coil 22 is electrically connected with one of the slip rings, in this case the slip ring 42, by means of a washer-like terminal member 60 to which the lead wire 40 is connected, and which terminal member is clamped in electrical contact against the web portion 51 of the slip ring 42 by one of the rivets 54. The terminal member 60 is insulated from the radial wall 53 of the magnet frame 27 by the intervening insulating layer 56. The other lead wire 41 of the field coil 22 is connected with a control switch 61 which forms an important part of the clutch 10 and will be described next.

The control switch 61 is connected for rotation with one of the rotatable power transmitting members of the clutch 10 and, in this instance, is connected with the driven member 12. The switch 61 comprises a pair of cooperating relatively fixed and movable contact members 62 and 63, and a centrifugally movable switch member or arm 64 carrying the movable contact member 63.

The contact member 62 is mounted on the drum portion 50 of the driven member 12, as by means of a riveted stem portion 65 extending through such drum portion and electrically insulated therefrom by insulating material 65a. The lead wire 41 of the magnet coil 22 is connected to the contact member 62. The switch arm 64 is a resiliently flexible arm which is anchored on the driven member 12, as by means of an L-shaped bracket 66 which is here shown as being welded onto the web portion 52 of the slip ring 43. The resilient character of the arm 64 is such as to provide a bias by which the contact member 63 is urged toward a normally-closed position in engagement with the contact member 62.

As shown in Fig. 1, the switch arm 64 is provided at the free end thereof with a flat extension portion 68 forming an armature for cooperation with a magnet 69 carried by the driven member 12. The magnet 69 is preferably a permanent magnet as here shown and is connected with the driven member as by being welded or cemented against the inner surface of the slip ring 43. The magnet 69 is located directly opposite the armature portion 68 of the switch arm 64, such that upon opening of the contacts of the switch 61 by the action of centrifugal force on the switch arm, the armature portion will come into engagement with the free end of the magnet 69 and will be drawn against the latter by the magnetic attraction exerted thereon by the magnet.

From the construction of the clutch 10 and the circuit diagram of Fig. 3 as thus far described, it will be seen that the current being supplied to the field coil 22 from the battery 38 passes through the brushes 44 and 45 and the slip rings 42 and 43 and is controlled by the switch 61. The contact 62 will initially be in a closed position causing energization of the field coil 22 and an engagement of the clutch member 13 with the clutch member 14, such that the member 12 will be connected with the shaft 11 and driven thereby.

When the speed of rotation of the input member 11 increases and the driven member 12 is rotated at a correspondingly increased speed, centrifugal force will cause the switch arm 64 to be moved outwardly in opposition to the resilient bias, thereby opening the switch contacts and de-energizing the field coil 22 to permit the clutch member 13 to disengage itself from the clutch member 14. The switch-opening movement of the arm 64 causes the armature portion 68 to engage the free end of the magnet 69 and to be held by the latter for temporarily maintaining the switch contacts in the open position. The inertia of the driven member 12, and of the device being driven therefrom, is such that the driven member will continue to rotate, but at a progressively decreasing speed.

When the speed of rotation of the driven member 12 decreases sufficiently, such that the combined effect of the centrifugal force acting on the switch arm 64 and the holding attraction of the permanent magnet 69 are no longer sufficient to resist the resilient bias of the arm, the contact member 63 will be moved by the arm to its closed position in engagement with the contact member 62. This return movement of the switch arm 64 also moves the armature portion 68 away from the permanent magnet 69 and back to the position shown in Fig. 1. The reclosing of the switch contacts re-energizes the field coil 22 to thereby cause the clutch member 13 to again be moved to its clutch-engaged position against the clutch member 14.

From the functioning of the clutch 10 just above described, it will be seen that the clutch will be intermittently actuated to its engaged condition for connecting the output or driven member 12 with the input or driving member 11. The functioning of the control switch 61 may take place relatively rapidly as the speed changes become effective thereon, such that a series of relatively rapid driving impulses or torque pulses will be supplied from the input shaft 11 to the output member 12, with the result that the output member will be driven at a desired substantially uniform rate of speed regardless of wide variations in the rotation speed of the input shaft 11. The holding action of the magnet 69 on the switch arm 64 delays the reclosing of the switch contacts in such a manner that the reclosing occurs in a predetermined relation to the centrifugal opening of the contacts whereby the speed range or differential, during which the field coil 22 is energized for establishing the torque transmitting connection or driving interval, is determined or established with the result that the above-mentioned substantially uniform rotation speed for the driven member 12 is achieved.

Separation of the clutch member 13 from the clutch member 14 when the coil 22 is de-energized is produced or assisted by a suitable compression spring 70 disposed between the member 13 and the inner race of the adjacent bearing 32.

The separation of the clutch members 13 and 14, which occurs intermittently between the torque pulses, permits cooling of the clutch members by a circulation of air or other cooling medium therebetween. In a friction type clutch, such as that here shown, this cooling opportunity between the torque pulses is very important and greatly prolongs the useful life of the clutch.

Figs. 4 and 5 of the drawings show a power transmitting clutch 71 of the same form and construction as the clutch 10, but which is provided with a control switch 72 of a different form. The parts of the clutch 71 which correspond with those of the clutch 10 have been designated by the same reference characters. The control switch 72 occupies the substantially same location in the energizing circuit for the field coil 22 as is represented in Fig. 3 for the control switch 61.

The control switch 72 comprises a pair of relatively fixed contact members 73 and 74 which are mounted on, but insulated from, the slip ring 43 and a pair of movable contact members 75 and 76 cooperating therewith and carried by a bridging contact or switch member 77. The contact members 73 and 74 are connected with the web portion 52 of the slip ring 43 by an angle-shaped bracket 79 and are carried by flexible arms 80 and 81 which are attached to the bracket 79 by means of rivets 82. The contact members 73 and 74 and their associated rivets 82 are insulated from the bracket 79 by a suitable insulating cover 79a on the latter and suitable insulating bushings 82a applied to the rivets.

The contact member 73 is electrically connected with the slip ring 43 by means of a lead wire 83 and a terminal member 84, and the contact member 74 is connected with the inner end of the field coil 22 by the lead wire 85. The outer end of the coil 22 is connected with the slip ring 42 by the lead wire 40 and the terminal member 60.

The bridging contact 77 carrying the contact members 75 and 76 is mounted on the web portion 52 of the slip ring 43 by means of an angle-shaped bracket 87 and a support stem 88 of a non-circular cross-section projecting from the bracket. The inner end of the stem 88 extends toward the support bracket 79 and is provided with a head 89. The bridging contact 77 is slidable on the stem 88 and retained thereon by means of the head 89 of the latter. The portion of the stem 88 which extends through the bracket 87 is insulated from the latter by a suitable insulating cover 90 on the latter. A threaded cylindrical portion 91 at the outer end of the stem 88 is engaged by a pair of damping and adjusting nuts 92. A compression spring 93 disposed around the stem 88 is effective on the bridging contact 77 and biases the same in a direction to cause a normally-closed engagement of the contact members 75 and 76 with the contact members 73 and 74.

The control switch 72 also includes, as an important part thereof, a magnet 95 which is here shown as being a permanent magnet and which is mounted on the stem 88 adjacent the outer support bracket 87 and is held against the insulating cover 90 of the latter by the action of the spring 93. The bridging contact 77 forms an armature for the permanent magnet 95 and, when the bridging contact is moved in a switch-opening direction by centrifugal force in response to rotation of the driven member 12, it will come into engagement with the permanent magnet and will be temporarily retained thereby in a switch-open position for temporarily de-energizing the field coil 22 of the clutch.

The functioning of the control switch 72 is thus similar to that of the control switch 61 in that the contacts are opened in response to centrifugal force. Likewise, when the speed of rotation of the driven member 12 has decreased a predetermined amount, the combined effect of the centrifugal action and the attraction of the magnet 95 will no longer retain the bridging contact 77 in the open position, whereupon the spring 93 will reclose the switch contacts to cause re-energization of the field coil 22.

Another feature of the present invention resides in the provision of the flexible arms 80 and 81 for supporting the contact members 73 and 74 of the control switch 72. These arms are resiliently flexible and have an initial twist therein, as represented by the dotted line showing 81a of Fig. 6 for the support arm 81. The bridging contact 77 is preferably also of a resiliently flexible character and, when the bridging contact is of this form of construction, it preferably also has an initial twist therein adjacent each of the contact members 75 and 76. Such an initial twist 77a is represented in the dotted-line showing of Fig. 6.

When the bridging contact 77 is moved by the spring 93 in the direction to close the switch contacts, the engagement of the contact 76 with the contact 74 results in a flexing and twisting of the resilient contact supporting portions, by which the initial twist or twists in such support portions return to, or assume, a transversely straight relation as shown in full lines in Figs. 5 and 6. The tilting movement thus imparted to one or both of the contact members of each pair, cause a wiping engagement therebetween which is highly desirable and advantageous for maintaining the contact surface clean, and for obtaining a good electrical connection between the pairs of contact members 73, 75 and 74, 76.

Fig. 7 of the drawings shows a clutch 97 of the same form and construction as the clutches 10 and 71, but which is provided with still another form of control switch 98 for controlling the energization of the field coil 22. The control switch 98 is similar to the control switch 61 of Fig. 1, but differs therefrom in that the magnet for retarding the switch actuation is carried by and movable with the resilient switch arm 99. The magnet of the control switch 98 is preferably a permanent magnet 100 and is mounted on the switch arm 99 with the poles 100a thereof extending toward the drum portion 50 on which the relatively fixed switch contact 62 is mounted.

The arrangement for the permanent magnet 100 is such that when the resilient bias provided by the switch arm 99 urges the movable contact 63 to its normally-closed position in engagement with the contact member 62, the poles of the magnet will be adjacent or against the drum portion 50 such that the portion of the latter which spans the poles of the movable magnet will act as a relatively stationary armature for the latter. The effect of the permanent magnet 100 will be to assist the resilient arm 99 in maintaining the contact members 62 and 63 closed and will delay the opening of these contact members by the action of centrifugal force on the switch arm. The resultant effect of the resilient bias of the switch arm 99, the holding action of the permanent magnet 100 and the action of centrifugal force on the switch arm, will be such as to determine and provide an appropriate interval or speed differential during which the field coil 22 will be energized and, as the result of which, intermittent driving pulses will be applied member 12. The driven member 12 will thus be rotated at a desired substantially uniform speed, regardless of wide variations in the speed of rotation of the input shaft 11.

Figs. 8 and 9 of the drawings show yet another clutch 103 which is of the same form and construction as the clutches 10, 71 and 97 but which is provided with still another form of control switch 104 for causing the intermittent energization of the field coil 22. The control switch 104 is substantially the same as the control switch 72 of the clutch 71, with the exception that the permanent magnet 105 is located adjacent the support bracket 79 and is held against the insulating cover 79a of the latter by a clamping shoulder 106 provided on the stem 88. The arrangement and mounting of the pairs of cooperating contact members 73, 75 and 74, 76 of the control switch 104 is substantially the same as for the contact members of the control switch 72.

In the control switch 104 the stem 88 is supported by the bracket 79, and hence, the outer support bracket 87 is not needed and has been omitted. A washer 107 located on the non-circular stem 88 adjacent the adjusting nuts 92 provides a seat for the outer end of the spring 93. The spring 93 biases the contact members 75 and 76 toward a closed position in engagement with the contact members 73 and 74 and the action of this spring in temporarily holding the contacts closed is assisted by the action of the permanent magnet 105 on the bridging contact 77.

The functioning of the control switch 104 is generally similar to that of the control switch 98 by reason of the fact that the spring 93 and the permanent magnet 105 act in conjunction with each other in temporarily delaying the opening of the switch contacts in response to the action of centrifugal force on the bridging contact 77.

From the accompanying drawings and the foregoing detailed description, it will now be readily understood that this invention provides novel power transmitting means in the form of an electrically controlled clutch by which driving impulses or torque pulses are intermittently supplied to the driven member when the clutch is repeatedly actuated to an engaged condition. It will now also be seen that, by reason of a holding action effective on the control switch, the switching function thereof is delayed or retarded to establish the speed differential during which the intermittent energization of the clutch takes place. Additionally, it will be seen that through the intermittent actuation of the clutch, the transmission of power by successive pulses will be such that the driven member will be rotated at a desired substantially uniform rate of speed by a substantially constant torque delivery of the clutch, regardless of wide speed variations of the driving member, and with an opportunity for effective cooling of the clutch between pulses which is very important when the clutch is of the friction type.

Although the power transmitting clutches of this application have been illustrated and described herein to a somewhat detailed extent, it will be understood, of course, that the invention is not to be regarded as limited correspondingly in scope, but includes all changes and modifications coming within the terms of the claims hereof.

Having thus described my invention, I claim:

1. In an electrically controlled clutch, a pair of cooperating relatively rotatable clutch members, electrically energizable means for producing a clutch-engaged relation between said clutch members, current supply means connected with said energizable means and including a control switch rotatable with one of said clutch members, said switch comprising cooperating relatively stationary and relatively movable contact members and a switch member carrying the movable contact member and being centrifugally shiftable for causing switching actuation of said movable contact member from a first switch position to a second switch position, said switch member being resiliently biased for moving said movable contact member toward said first switch position, and holding means effective on said switch member and comprising a permanent magnet rotatable with said one clutch member, said switch member being in direct engagement with said magnet and being subject to holding thereby in response to magnetic attraction provided by said magnet, when said movable contact member is in one of said switch positions.

2. In an electrically controlled clutch, a pair of co-cooperating relatively rotatable clutch members, electrically energizable means for producing a clutch-engaged relation between said clutch members, current supply means connected with said energizable means and including a control switch rotatable with one of said clutch members, said switch comprising cooperating relatively stationary and relatively movable contact members and a switch member carrying the movable contact member and being centrifugally shiftable for causing switching actuation of said movable contact member from a first switch position to a second switch position, spring means acting on said switch member in opposition to centrifugal force for moving said movable contact member to said first switch position as a normal position, and holding means effective on said switch member and comprising a permanent magnet rotatable with said one clutch member, said switch member being in direct engagement with said magnet and being subject to holding thereby in response to magnetic attraction provided by said magnet, when said movable contact member is in one of said switch positions.

3. An electrically controlled clutch as defined in claim 1 and which includes relatively rotatable power input and power output members, and wherein said one clutch member and said switch are connected with said power output member for rotation therewith.

4. In an electrically controlled clutch, a pair of cooperating relatively rotatable clutch members, electrically energizable means for producing a clutch-engaged relation between said clutch members, current supply means connected with said energizable means and including a control switch rotatable with one of said clutch members, said switch comprising cooperating contact members and a movable switch member for causing switching actuation of one of said contact members in opposite directions, said one contact member having a resiliently biased normally-closed first position in engagement with an associated one of said contact members, said switch member being centrifugally movable in response to rotation of said one clutch member for causing opening actuation of said one contact member to a second position in opposition to the resilient bias, and a permanent magnet rotatable with said one clutch member and effective on said switch member for retarding contact actuating movement thereof in one of said directions, said switch member comprising a portion extending in co-operating relation to said permanent magnet and being subject to holding in response to magnetic attraction provided by the magnet when said movable contact member is in one of said positions.

5. In clutch mechanism, a pair of relatively rotatable driving and driven members, a pair of cooperating relatively rotatable clutch members connected respectively with said driving and driven members, an electromagnet carried by the driven member, one of said clutch members being actuatable to a clutch-engaged position relative to the other clutch member in response to energization of said electromagnet, current supply means connected with said electromagnet and including a control switch mounted on and rotatable with said driven member, said switch comprising cooperating contact members and a movable switch member for causing switching actuation of one of said contact members in opposite directions as a movable contact member, said switch member being resiliently biased in one direction for actuating said movable contact member to a normally-closed first position in engagement with an associated one of said contact members and being centrifugally movable in the opposite direction for causing actuation of said movable contact member to an open second switch position, and a permanent magnet rotatable with said driven member and effective on said switch member for retarding the contact actuating movement of the relatively stationary and relatively movable contact members and a switch member carrying the movable contact member and being centrifugally shiftable for causing switching actuation of said movable contact member from a first switch position to a second switch position, spring means acting on said switch member in opposition to centrifugal force for moving said movable contact member to said first switch position as a normal position, and holding means effective on said switch member and comprising a permanent magnet rotatable with said one clutch member, said switch member being in direct engagement with said magnet and being subject to holding thereby in response to magnetic attraction provided by said magnet, when said movable contact member is in one of said switch positions.

6. In clutch mechanism, a pair of relatively rotatable driving and driven members, a pair of cooperating relatively rotatable clutch members connected respectively with said driving and driven members, an electromagnet carried by the driven member, one of said clutch members being actuatable to a clutch-engaged position relative to the other clutch member in response to energization of said electromagnet, current supply means connected with said electromagnet and including a pair of cooperating fixed and movable contact members mounted on said driven member for rotation therewith, a resilient switch arm mounted on said driven member for rotation therewith and for swinging in opposite directions and supporting said movable contact member, said arm providing a bias for urging said movable contact member toward a normally-closed position in engagement with said fixed contact member and being centrifugally movable in opposition to such bias for causing movement of the movable contact member to an open position, and a permanent magnet rotatable with said driven member and effective on said switch arm for retarding the contact actuating movement thereof in one of said directions, said switch arm being in direct engagement with said magnet and being subject to holding thereby in response to magnetic attraction provided by said magnet, when said movable contact member is in one of said positions.

7. In clutch mechanism, a pair of relatively rotatable driving and driven members, a pair of cooperating relatively rotatable clutch members connected respectively with said driving and driven members, an electromagnet carried by the driven member, one of said clutch members being actuatable to a clutch-engaged position relative to the other clutch member in response to energization of said electromagnet, current supply means connected with said electromagnet and including a control switch, said switch comprising a pair of relatively fixed contact members and a bridging contact member, said pair of contact members and said bridging contact member being mounted on and rotatable with said driven member, spring means effective on said bridging contact member for urging the same in one direction toward a normally-closed position in engagement with said fixed contact members, said bridging contact member being centrifugally movable in the opposite direction for opening said contact members, and a permanent magnet rotatable with said driven member and effective on said bridging contact member for retarding switching movement thereof in one of said directions.

8. In clutch mechanism, a pair of cooperating relatively movable clutch members, electrically energizable means for producing a clutch-engaging relative movement between said clutch members, current supply means connected with said energizable means and including a control switch, said switch comprising cooperating contact members and movable means for causing switching actuation of one of said contact members, and a twistably yieldable arm supporting one of said contact members for producing a wiping engagement between said contact members in response to closing actuation therebetween.

9. In clutch mechanism, a pair of cooperating relatively movable clutch members, electrically energizable means for producing a clutch-engaging relative movement between said clutch members, current supply means connected with said energizable means and including a control switch, said switch comprising a pair of cooperating contact members and an actuating means for producing relative closing movement between said contact members, and a yieldable arm supporting one of said contact members and having an initial twist therein, said arm being subject to flexing thereof by closing actuation between said contact members for producing a wiping engagement of one contact member against the other.

10. Clutch mechanism as defined in claim 8 in which said switch includes a yieldable support arm having an initial twist therein for each contact of said pair.

11. In clutch mechanism, a pair of relatively rotatable driving and driven members, a pair of cooperating relatively rotatable clutch members connected respectively with said driving and driven members, an electromagnet carried by the driven member, one of said clutch members being actuatable to a clutch-engaged position relative to the other clutch member in response to energization of said electromagnet, current supply means connected with said electromagnet and including a control switch mounted on and rotatable with said driven member, said switch comprising cooperating contact members and a centrifugally movable switch member for causing switching actuation of one of said contact members in one direction, means producing a resilient bias for causing switching actuation of one of said contact members in the opposite direction, a permanent magnet carried by said driven member and effective on said switch member for retarding the contact actuating movement of the latter in one of said directions, and a yieldable and tiltable arm supporting one of said contact members, said arm being subject to flexing and tilting thereof in response to relative closing of said contact members for producing a wiping engagement of one contact member against the other.

12. Clutch mechanism as defined in claim 1 and wherein said magnet is relatively stationary on said one clutch member and said first switch position is a normally-closed position, and wherein said switch member comprises a portion of magnetic material directly engageable with said magnet for holding by magnetic attraction by the latter in resisting relation to the action of said resilient bias and in additive relation to centrifugal action on said switch member.

13. Clutch mechanism as defined in claim 1 and wherein said magnet is relatively stationary on said one clutch member and said first switch position is a normally-closed position, and wherein said switch member comprises a resilient arm having a portion of magnetic material directly engageable with said magnet for holding by magnetic attraction by the latter in resisting relation to the action of said resilient bias and in additive relation to centrifugal action on said switch member.

14. Clutch mechanism as defined in claim 1 and wherein said magnet is relatively stationary on said one clutch member and said first switch position is a normally-closed position, and wherein said switch member comprises a portion of magnetic material directly engageable with said magnet for holding by magnetic attraction by the latter, said magnet being disposed so that the holding action thereof on said switch member is in additive relation to the action of said resilient bias and in resisting relation to centrifugal action on said switch member.

15. Clutch mechanism as defined in claim 1 and wherein said first switch position is a normally-closed position and said switch member comprises a resilient arm, said magnet being carried by and movable with said arm for magnetic holding cooperation with a portion of said first clutch member when said movable contact member is in said second switch position, said holding co-operation being in additive relation to said resilient bias and in resisting relation to centrifugal action on said switch member.

References Cited in the file of this patent

UNITED STATES PATENTS

| | | |
|---|---|---|
| 1,167,602 | Strang | Jan. 11, 1916 |
| 1,868,910 | Miller | July 26, 1932 |
| 1,870,032 | Young et al. | Aug. 2, 1932 |
| 2,438,810 | Lambert | Mar. 30, 1948 |
| 2,528,316 | Mayo | Oct. 31, 1950 |
| 2,639,414 | Gould | May 19, 1953 |
| 2,643,871 | Warrick | June 30, 1953 |
| 2,677,539 | Winslow | May 4, 1954 |
| 2,744,976 | Black | May 8, 1956 |
| 2,751,454 | Gaylord et al. | June 19, 1956 |
| 2,833,879 | Naul | May 6, 1958 |

UNITED STATES PATENT OFFICE
CERTIFICATE OF CORRECTION

Patent No. 2,945,104                           July 12, 1960

Ralph L. Jaeschke

It is hereby certified that error appears in the printed specification of the above numbered patent requiring correction and that the said Letters Patent should read as corrected below.

Column 9, line 36, beginning with "relatively stationary" strike out all to and including "switch positions." in line 50, same column, and insert instead -- latter in one of said directions, said switch member comprising a portion extending in co-operating relation to said permanent magnet and being subject to holding in response to magnetic attraction provided by the magnet when said movable contact member is in one of said positions. --.

Signed and sealed this 3rd day of January 1961.

(SEAL)
Attest:

KARL H. AXLINE                                      ROBERT C. WATSON
Attesting Officer                                   Commissioner of Patents